United States Patent Office 3,051,872
Patented Aug. 28, 1962

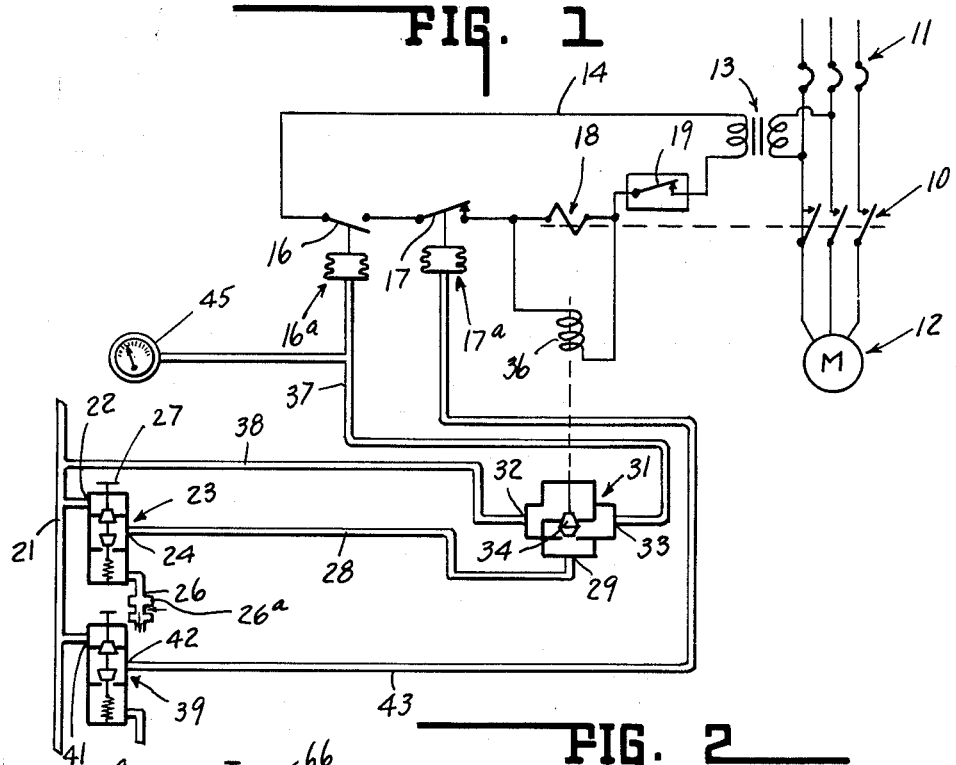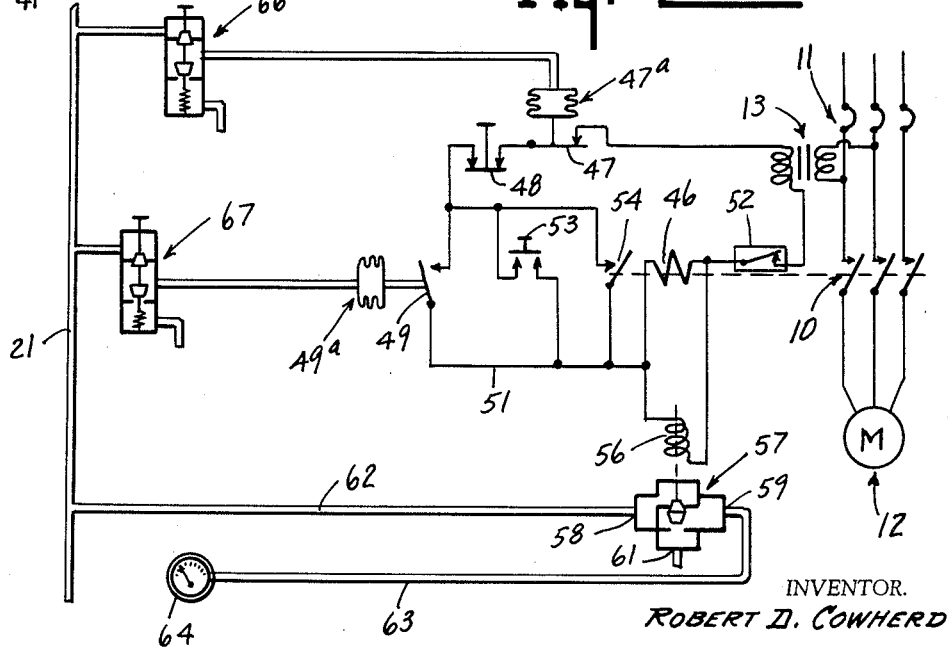

3,051,872
ELECTROPNEUMATIC CONTROL CIRCUIT
Robert D. Cowherd, R.R. 2, Box 403 A–1,
West Terre Haute, Ind.
Filed Oct. 7, 1958, Ser. No. 765,780
10 Claims. (Cl. 317—123)

This invention relates generally to circuits for controlling motors or the like and in particular to a control circuit which incorporates both electrical and pneumatic components.

In applications where motor starting equipment is to be actuated in an explosive atmosphere, such as in chemical plants or the like, conventional electrical control involves substantial expense in minimizing the inherent danger of electrical circuits in the explosive atmosphere. In such installations at each control station all of the components, including push-button switches and pilot lights, must be constructed and installed with explosion resistant fittings and wired by means of electrical conduit to an external motor control center or sub-station remote from the hazardous location.

It is an object of the present invention to provide a control circuit adapted for use in explosive atmospheres wherein pneumatic components disposed at the hazardous location are integrated with electrical components remote from the hazardous location to provide a flexible, relatively low cost control installation for motors or similar electrical loads.

A further object of the present invention is to provide an electropneumatic control circuit for motors or the like which permits the motor starter to return to energized position at the termination of power failures of relatively short duration but which, upon more prolonged power failures, conditions the control circuit so that resetting is required before motor operation can be resumed.

A further object of the present invention is to provide an electropneumatic control circuit for control of motors or the like having fail safe features wherein the electrical portion of the circuit is deenergized upon a pneumatic failure and the pneumatic portion of the circuit is deenergized upon an electrical failure.

A further object of the present invention is to provide an electropneumatic control circuit providing pneumatic push-button controls, suitable for location in an explosive atmosphere, for electrically actuating remote motor-controlling elements, the control circuit including a pneumatic indicator adapted to be located in the explosive atmosphere for positively indicating the energized or deenergized state of the remote motor-controlling elements.

A further object of the present invention is to provide an electropneumatic control circuit of the type referred to above having means for manually controlling the motor at both the pneumatic control station and at the external, remote motor starter center.

These and other objects will become apparent as the description proceeds with reference to the accompanying drawings in which:

FIG. 1 is a schematic diagram of a control circuit embodying the present invention.

FIG. 2 is a schematic diagram of a modified form of control circuit embodying the present invention.

Referring initially to FIG. 1, the control circuit may be seen to incorporate certain electrical and pneumatic components for determining the operation of the motor starting switches indicated generally at 10. The starter switches are imposed in a conventional three-phase power supply line equipped with circuit breakers 11 and providing power to a motor or other load means indicated generally at 12.

Low voltage power for a control circuit is provided by a transformer 13 having its primary connected across the power input line. A wire 14 connects one side of the transformer secondary to a normally open, pressure operated switch 16. The switch 16 is further connected in series with the normally closed, pressure operated switch 17. The pressure operated switches 16 and 17 are of a conventional type and are constructed so as to move from their deactuated to their actuated positions upon the application of pressure to their operating elements indicated generally at 16a and 17a respectively.

The pressure operated switch 17 is connected to a motor starter coil 18, which is of a conventional type and which controls the position of the motor starter switches 10. An overload switch 19 which may be of a conventional type and responsive to any desired overload condition is connected to the other side of the coil 18 and is, in turn, connected to the secondary of the transformer 13.

The reference numeral 21 indicates a header or supply pipe which is connected to a source of fluid control pressure. Any of a variety of fluids may be utilized as a control fluid, the more conventional fluid being air at a pressure of twenty pounds per square inch. Connected to the header 21 is the input port 22 of a normally-closed, push-button operated starter valve indicated generally at 23. This valve is of a conventional type and, as will be apparent from the schematic illustration of FIG. 1, the valve outlet port 24 communicates with the vent 26 and the adjustable restriction 26a carried thereby when the valve is in deactuated position. Depressing the push-button 27 serves to connect the valve inlet port 22 with the valve outlet port 24. The outlet port 24 is connected by means of suitable tubing 28 to the normally open port 29 of a solenoid valve indicated generally at 31.

The valve 31 is of a conventional type having in addition to the normally open port 29, a normally closed port 32 and a common port 33. Selective communication between these ports is achieved by movement of a valve member 34 between adjacent seats, the movement of the valve member being controlled by a solenoid operator 36 which is connected in parallel to the motor starter coil 18. The common port 33 of the valve 31 is connected by means of tubing 37 to the operator 16a for the switch 16. The normally closed port 32 of the valve 31 is connected by means of tubing 38 directly to the header 21.

A normally-closed, push-button operated stop valve 39 has its inlet port 41 connected to the control pressure supply header and has its outlet port 42 connected by means of tubing 43 to the operator 17a for the switch 17. The stop valve 39 is identical in construction to the start valve 23. When deactuated the stop valve vents the tubing 43 to atmosphere and when actuated supplies control pressure to the tubing 43. The line 37 has connected thereto an indicator 45 which functions to provide a visual indication of the position of switch 16 and hence the state of the energizing circuit for the starter coil 18.

In operation, with the components in their positions of FIG. 1, the energizing circuit for starter coil 18 will be open at the switch 16. The switch 16 is maintained in open position because the operator 16a is vented to atmosphere through tubing 37, port 33, port 29, port 24 and vent 26.

Momentary depressing of the push-button of the valve 23 supplies control pressure to the operator for the switch 16, moving it to closed position and energizing starter coil 18 thereby closing switches 10. Solenoid operator 36 is also energized to close off the solenoid valve port 29 and to supply control pressure to the operator for the switch 16a through the solenoid valve ports 32 and 33. Switch 16 is, therefore, held closed subsequent to deactuation of the start valve 23.

With the starter coil 18 energized and the load such as motor 12 supplied with power, subsequent removal of power from the load may be accomplished by momentarily actuating the stop valve 39. Actuation of the stop valve applies control pressure to the operator 17a for the switch 17, causing it to open and de-energize starter coil 18. The consequent de-energization of the solenoid operator 36 causes the valve 31 to move to its position of FIG. 1 thereby opening switch 16. The energizing circuit for the starter coil 18 thus remains open subsequent to deactuation of the stop valve 39.

It will be understood that the start and stop valves may be located at a control station in a hazardous location such as one having explosive atmosphere. The electrical components and the solenoid valve 31 may be located at a remote motor control station removed from the hazardous location. Electrical power failure will cause the starter coil 18 and the solenoid operator 36 to move to their de-energized positions, thereby placing the circuit in a condition such that the starter coil can only be re-energized by actuating the start valve 23. Upon failure of control pressure the switch 16 will open, breaking the circuit to the starter coil. The control circuit thus reverts to a safe condition upon either an electrical or a pneumatic failure.

Since the pneumatic system forming a component of the present invention has an inherent time constant, it will be evident that a momentary power failure, having a duration for example of the order of three or four cycles, may occur without causing the control circuit to reset to starting condition. For power failures of momentary duration, therefore, the starting coil 18 is immediately re-energized upon the return of power without requiring that the circuit reset by actuation of the start valve 23. It will be evident that by varying the capacity of the pneumatic system the time interval referred to may also be varied within desirable limits. One convenient means for accomplishing this variation is provided by the adjustable restriction 26a which times the bleed-off of pressure from the element 16a.

Referring now to FIG. 2, a modified form of the control circuit of the present invention is there disclosed. In FIG. 2 environmental components having the same function as those disclosed in FIG. 1 are provided with the same reference numerals. The electrical circuit for the motor starter coil 46 includes the normally closed, pressure-operated switch 47 having the pressure responsive operator 47a.

Connected in series with the switch 47 is the normally closed, push-button operated switch 48. The push-button operated switch is further connected to the normally open pressure operated switch 49 having a pressure responsive operator 49a. The opposite side of the switch 49 is connected by means of a wire 51 to one side of the motor starter coil 46. The coil 46 is connected to the secondary of the transformer 13 through a conventional overload switch 52. Connected in shunt relation to the switch 49 is a normally open, push-button operated switch 53 and a holding switch 54 operated by the starter coil 46.

Connected in parallel with the coil 46 is a solenoid operator 56 which functions to operate the solenoid valve 57. The solenoid valve 57 is substantially identical to the valve 31 of FIG. 1 and is provided with an input or normally closed port 58, an output or common port 59 and a normally open or venting port 61. The port 58 of the valve is connected by means of tubing 62 to the control pressure header 21. The port 59 of the solenoid valve is connected by means of tubing 63 to an indicator designated generally by reference numeral 64. The indicator 64 functions to provide a visual indication of the state of the energizing circuit for the starter coil 46. Thus when the solenoid valve 57 is in its de-energized position of FIG. 2, the indicator will be vented to atmosphere through the ports 59 and 61. When the valve is moved to energized position, control pressure will be supplied to the indicator through ports 58 and 59. The indicator 64 may thus take the form of a "go, no-go" type of pressure gage, providing a visual indication at the control station of the condition of the energizing circuit for the starter coil 46.

A push-button operated, normally closed stop valve 66 controls the application of pressure to the operator 47a for the switch 47. A similar push-button operated start valve 67 controls the application of pressure to the operator 49a for the switch 49.

In operation, with the components in their positions of FIG. 2, the energizing circuit for the starter coil 46 will be open at the switch 49. Momentary actuation of the start valve 67 closes switch 49 energizing the starter coil 46. The starter switches 10 are thereupon closed to supply power to the load device such as the motor 10. Energization of coil 46 also closes the holding switch 54 to maintain the coil 46 energized independently of the switch 49. The consequent energization of the solenoid coil 56 supplies control pressure to the indicator 64 through the solenoid valve 57 to provide an indication that the starter coil 46 has been energized.

With the starter coil 46 energized and the motor 12 supplied with power, subsequent removal of power from the load may be accomplished by momentary actuation of the stop valve 66. Actuation of the stop valve opens the switch 47 to de-energize the starter coil 46. The consequent opening of holding switch 54 reconditions the circuit so that the starter coil can again be energized only by actuation of the start valve 67. Removal of control pressure from the indicator 64 upon de-energization of the solenoid coil 56 provides an indication that the starter coil 46 has been de-energized.

It will be understood that the valves 66 and 67 and the indicator 64 may be located in a location made hazardous by, for example, being subject to an explosive atmosphere, while the remaining components of the control circuit may be located at a remote motor control station away from the hazardous location. The push-button start and stop switches 53 and 48 provide a means of electrically controlling the application of power to the load at the external motor control station. Upon an electrical failure, the resulting opening of the holding switch 54 conditions the circuit so that the starter coil 46 can only be re-energized by actuation of the start valve 67.

The form of the control circuit shown in FIG. 2 differs from that shown in FIG. 1 principally in that the starter coil 46 drops out and the circuit is reset to starting condition on power failures of even momentary duration. This form of the circuit is particularly advantageous where large amounts of power and multiple loads are controlled, it being undesirable in these applications to return all of the loads to the line simultaneously. The modified form shown in FIG. 2 further differs from that of FIG. 1 in that a means is provided, through switches 53 and 48 for controlling the load at the external motor control center. The form of FIG. 2 also differs in the circuit location of the indicator 64 as compared to indicator 45 of FIG. 1 whereby the state of the starter coil 46 may be monitored at the location of the start and stop valves 66 and 67. While a single load device, such as motor 12 has herein been described as controlled by the circuit of the present invention, it will be understood that a plurality of loads might be so controlled.

While the invention has been disclosed and described in some detail in the drawings and the foregoing description, they are to be considered as illustrative and not restrictive in character, as other modifications may readily suggest themselves to persons skilled in this art and within the broad scope of the invention, reference being had to the appended claims.

The invention claimed is:

1. An electropneumatic control circuit for controlling a motor starter or the like from a remote control station subjected to an explosive atmosphere, said control circuit including: a source of electrical power, a motor starter coil, and normally closed and normally open fluid pressure operated switches interposed in series in said control circuit whereby said power source is connected across said starter coil when said switches are closed, a holding switch operated upon energization of said starter coil to shunt said normally open switch, a push-button operated normally closed start valve and a push-button operated normally closed stop valve located at said control station, means for supplying a control fluid pressure to the input ports of said valves, said valves being adapted when actuated to admit said control pressure to their output ports and when deactuated to vent their output ports to atmosphere, means connecting the output port of said start valve to said normally open pressure operated switch and connecting the output port of said stop valve to said normally closed pressure operated switch, whereby momentary actuation of said start valve energizes said motor starter coil, said starter coil being thereafter held energized through said holding switch, and momentary actuation of said stop valve de-energizes said starter coil, and a solenoid valve having its operating coil connected in parallel with said motor starter coil, said solenoid valve being adapted to establish communication between its input port and its output port when energized and to vent its output port to atmosphere when de-energized, means for supplying control fluid pressure to the input port of said solenoid valve, a pressure responsive indicator disposed at said control station and connected to the output port of said solenoid valve, whereby said indicator functions to indicate at said control station the energized or de-energized state of said starter coil.

2. An electropneumatic control circuit for controlling a motor starter or the like from a remote control station in a hazardous location, said control circuit including: a source of electrical power, a motor starter coil, and normally closed and normally open fluid pressure operated switches interposed in series in said control circuit whereby said power source is connected across said starter coil when said switches are closed, a holding switch operated upon energization of said starter coil to shunt said normally open switch, normally closed start valve and a normally closed stop valve located at said control station, means for supplying a control fluid pressure to the input ports of said valves, said valves being adapted when actuated to admit said control pressure to their output ports and when deactuated to vent their output ports to atmosphere, means connecting the output port of said start valve to said normally open pressure operated switch and connecting the output port of said stop valve to said normally closed pressure operated switch, whereby momentary actuation of said start valve energizes said motor starter coil, said starter coil being thereafter held energized through said holding switch, and momentary actuation of said stop valve de-energizes said starter coil, and a solenoid valve having its operating coil connected in parallel with said motor starter coil, said solenoid valve being adapted to establish communication between its input port and its output port when energized and to vent its output port to atmosphere when de-energized, means for supplying control fluid pressure to the input port of said solenoid valve, a pressure responsive indicator disposed at said control station and connected to the output port of said solenoid valve, whereby said indicator functions to indicate at said control station the energized or de-energized state of said starter coil.

3. An electropneumatic control circuit for controlling an electrical load from a remote control station, said control circuit including: a source of electrical power, a load controller, and normally closed and normally open fluid pressure operated switches interposed in series in said control circuit whereby said power source is connected across said load controller when said switches are closed, a holding switch operated upon energization of said load controller to shunt said normally open switch, a normally closed start valve and a normally closed stop valve located at said control station, means for supplying a control fluid pressure to the input ports of said valves, said valves being adapted when actuated to admit said control pressure to their output ports and when deactuated to vent their output ports to atmosphere, means connecting the output port of said start valve to said normally open pressure operated switch and connecting the output port of said stop valve to said normally closed pressure operated switch, whereby momentary actuation of said start valve energizes said load controller, said load controller being thereafter held energized through said holding switch, and momentary actuation of said stop valve deenergizes said load controller, and a solenoid valve having its operating coil connected in parallel with said load controller, said solenoid valve being adapted to establish communication between its input port and its output port when energized and to vent its output port to atmosphere when de-energized, means for supplying control fluid pressure to the input port of said solenoid valve, a pressure responsive indicator disposed at said control station and connected to the output port of said solenoid valve, whereby said indicator functions to indicate at said control station the energized or de-energized state of said load controller.

4. An electropneumatic control circuit for controlling an electric load from a remote control station, said control circuit including: a source of electrical power, a load controller, and normally closed and normally open fluid pressure operated switches interposed in series in said control circuit whereby said power source is connected across said load controller when said switches are closed, a holding switch operated upon energization of said load controller to shunt said normally open switch, a normally closed start valve and a normally closed stop valve located at said control station, means for supplying a control fluid pressure to the input ports of said valves, said valves being adapted when actuated to admit said control pressure to their output ports and when deactuated to vent their output ports to atmosphere, means connecting the output port of said start valve to said normally open pressure operated switch and connecting the output port of said stop valve to said normally closed pressure operated switch, whereby momentary actuation of said start valve energizes said load controller, said load controller being thereafter held energized through said holding switch, and momentary actuation of said stop valve de-energizes said load controller.

5. An electropneumatic control circuit for controlling a motor starter or the like, located at a motor control station, from a remote control station subjected to an explosive atmosphere, said control circuit including: a source of electrical power, a motor starter coil, and normally closed and normally open pressure operated switches connected in series in said control circuit whereby said power source is connected across said starter coil when said switches are closed, a push-button operated normally closed start valve and a push-button operated normally closed stop valve located at said control station, means for supplying a control fluid pressure to the input ports of said valves, said valves being adapted when actuated to admit said control pressure to their output ports and when deactuated to vent their output ports to atmosphere, means connecting the output port of said stop valve to said normally closed pressure operated switch, a solenoid valve having its operating coil connected in parallel with said motor starter coil, said solenoid valve having a normally closed port, a normally open port and a common port and adapted when energized to provide communication between said normally closed port and said common port and when de-energized to provide communication between said normally open port and said common port, means connecting said normally closed port to a source of pressurized control fluid, means connecting said normally open port to the output port of said start valve, and means connecting said common port to said normally open pressure operated switch, whereby momentary actuation of said start valve energizes said motor starter coil, said normally open pressure switch being thereafter maintained closed by control fluid pressure supplied through said normally closed and common ports of said solenoid valve, momentary actuation of said stop valve serving to open said control circuit through said normally closed pressure operated switch, consequent movement of said solenoid valve to de-energized position serving to reset said normally open pressure operated switch to its open position.

6. An electropneumatic control circuit for controlling a motor starter or the like from a remote control station in a hazardous location, said control circuit including: a source of electrical power, a motor starter coil, and normally closed and normally open pressure operated switches connected in series in said control circuit whereby said power source is connected across said starter coil when said switches are closed, a normally closed start valve and a normally closed stop valve located at said control station, means for supplying a control fluid pressure to the input ports of said valves, said valves being adapted when actuated to admit said control pressure to their output ports and when deactuated to vent their output ports to atmosphere, means connecting the output port of said stop valve to said normally closed pressure operated switch, a solenoid valve having its operating coil connected in parallel with said motor starter coil, said solenoid valve having a normally closed port, a normally open port and a common port and adapted when energized to provide communication between said normally closed port and said common port and when deenergized to provide communication between said normally open port and said common port, means connecting said normally closed port to a source of pressurized control fluid, means connecting said normally open port to the output port of said start valve, and means connecting said common port to said normally open pressure operated switch, whereby momentary actuation of said start valve energizes said motor starter coil, said normally open pressure switch being thereafter maintained closed by control fluid pressure supplied through said normally closed and common ports of said solenoid valve, momentary actuation of said stop valve serving to open said control circuit through said normally closed pressure operated switch, consequent movement of said solenoid valve to de-energized position serving to reset said normally open pressure operated switch to its open position.

7. An electromagnetic control circuit for controlling an electrical load from a remote control station, said control circuit including: a source of electrical power, a load controller, and normally closed and normally open pressure operated switches connected in series in said control circuit whereby said power source is connected across said load controller when said switches are closed, a normally closed start valve and a normally closed stop valve located at said control station, means for supplying a control fluid pressure to the input ports of said valves, said valves being adapted when actuated to admit said control pressure to their output ports and when deactuated to vent their output ports to atmosphere, means connecting the output port of said stop valve to said normally closed pressure operated switch, a solenoid valve having its operating coil connected in parallel with said load controller, said solenoid valve having a normally closed port, a normally open port and a common port and adapted when energized to provide communication between said normally closed port and said common port and when de-energized to provide communication between said normally open port and said common port, means connecting said normally closed port to a source of pressurized control fluid, means connecting said normally open port to the output port of said start valve, and means connecting said common port to said normally open pressure operated switch, whereby momentary actuation of said start valve energizes said load controller, said normally open pressure switch being thereafter maintained closed by control fluid pressure applied through said normally closed and common ports of said solenoid valve, momentary actuation of said stop valve serving to open said control circuit through said normally closed pressure operated switch, consequent movement of said solenoid valve to de-energized position serving to reset said normally open pressure operated switch to its open position.

8. An electropneumatic control circuit for controlling an electrical load from a remote control station, said control circuit including: a source of electrical power, a load controller, and normally closed and normally open fluid pressure operated switches interposed in series in said control circuit whereby said power source is connected across said load controller when said switches are closed, a normally closed start valve and a normally closed stop valve located at said control station, means for supplying a control fluid pressure to the input ports of said valves, said valves being adapted when actuated to admit said control pressure to their output ports and when deactuated to vent their output ports to atmosphere, means connecting the output port of said start valve to said normally open pressure operated switch and connecting the output port of said stop valve to said normally closed pressure operated switch, whereby momentary actuation of said start valve energizes said load controller and momentary actuation of said stop valve de-energizes said load controller, and means for retaining said load controller energized subsequent to the momentary actuation of said start valve and prior to actuation of said stop valve.

9. An electropneumatic control circuit for controlling an electrical power consuming device from a remote control station, said control circuit including: a source of electrical power, a power consuming device and normally closed and normally open fluid pressure operated switches interposed in series in said control circuit whereby said power source is connected across said power consuming device when said switches are closed, a normally closed start valve and a normally closed stop valve located at said control station, means for supplying a control fluid pressure to the input ports of said valves, said valves being adapted when actuated to admit said control pressure to their output ports and when deactuated to vent their output ports to atmosphere, means connecting the output port of said start valve to said normally open pressure operated switch and connecting the output port of said stop valve to said normally closed pressure operated switch, whereby momentary actuation of said start valve energizes said power consuming device and momentary actuation of said stop valve de-energizes said power consuming device, and means for retaining said power consuming device energized subsequent to the momentary actuation of said start valve and prior to actuation of said stop valve.

10. An electropneumatic control circuit for controlling a motor starter or the like, located at a motor control station, from a remote control station subjected to an explosive atmosphere, said control circuit including: a source of electrical power, a motor starter coil, and normally closed and normally open pressure operated switches connected in series in said control circuit whereby said power source is connected across said motor starter coil when said switches are closed, a push-button operated normally closed start valve and a push-button operated normally closed stop valve located at said control station, means for supplying a control fluid pressure to the input ports of said valves, said valves being adapted when actuated to admit said control pressure to their output ports and when deactuated to vent their output ports to atmosphere, said start valve output being vented to atmosphere through an adjustable restriction, means connecting the output port of said stop valve to said normally closed pressure operated switch, a solenoid valve having its operating coil connected in parallel with said motor starter coil, said solenoid valve having a normally closed port, a normally open port and a common port and adapted when energized to provide communication between said normally closed port and said common port and when de-energized to provide communication between said normally open port and said common port, means connecting said normally closed port to a source of pressurized control fluid, means connecting said normally open port to the output port of said start valve, and means connecting said common port to said normally open pressure operated switch, whereby momentary actuation of said start valve energizes said motor starter coil, said normally open pressure switch being thereafter maintained closed by control fluid pressure supplied through said normally closed and common ports of said solenoid valve, momentary actuation of said stop valve serving to open said control circuit through said normally closed pressure operated switch, consequent movement of said solenoid valve to de-energized position serving to reset said normally open pressure operated switch to its open position, said adjustable restriction serving to determine the time interval between movement of said solenoid valve to de-energized position and resetting of said normally open pressure operated switch.

References Cited in the file of this patent

UNITED STATES PATENTS

| | | |
|---|---|---|
| 1,817,213 | Smith | Aug. 4, 1931 |
| 2,084,877 | Uhde | June 22, 1937 |
| 2,722,656 | Marbury | Nov. 1, 1955 |
| 2,793,328 | Kuhn | May 21, 1957 |
| 2,812,477 | Forwald | Nov. 5, 1957 |